United States Patent [19]

First

[11] 4,234,927
[45] Nov. 18, 1980

[54] MICRO PROCESSOR CONTROLLED SENSOR SYSTEM FOR APARTMENT HOUSE

[76] Inventor: Theodore C. First, R.D. #1, Furnace, Pa. 16865

[21] Appl. No.: 904,173

[22] Filed: May 8, 1978

[51] Int. Cl.² .................... G06F 15/20; F28F 27/00
[52] U.S. Cl. ............................ 364/557; 62/127; 165/11 R; 364/418
[58] Field of Search ............... 364/400, 418, 464, 506, 364/557, 107; 236/1 E, 1 C, 46 R, 46 C, DIG. 8; 165/11, 12, 22, 32; 62/127; 340/163; 73/343.5, 344, 339 R, 340, 343 R

[56] References Cited

U.S. PATENT DOCUMENTS

| 3,400,374 | 9/1968 | Schumann | 364/418 X |
| 3,995,686 | 12/1976 | Laube | 165/11 |
| 4,002,890 | 1/1977 | Welin | 364/464 |
| 4,049,044 | 9/1977 | Cohen | 165/11 |
| 4,090,248 | 5/1978 | Swanson et al. | 236/DIG. 8 |
| 4,114,807 | 9/1978 | Naseck et al. | 364/418 X |

Primary Examiner—Joseph F. Ruggiero
Attorney, Agent, or Firm—Seidel, Gonda, Goldhammer & Panitch

[57] ABSTRACT

A microprocessor controlled sensor system for an apartment house periodically samples the temperature of each apartment at preselected sample intervals of time. The on/off state of a furnace calling device such as a thermostatic switch is also periodically sampled at the preselected sample intervals of time. The apartment temperature samples for each apartment are accumulated to provide an indication of the degree days. The number of times that the furnace has been called by each apartment is stored to provide an indication of the frequency of use of the furnace by each apartment. The degree days and the frequency of furnace use provide an indication of the efficiency of the apartment house heating system.

5 Claims, 5 Drawing Figures

MICRO PROCESSOR CONTROLLED SENSOR SYSTEM FOR APARTMENT HOUSE

BACKGROUND OF THE INVENTION

The present invention is directed to a microprocessor controlled sensor system for an apartment house. The invention periodically collects data for use in evaluating the operation of the apartment house heating system. Apartment temperature data is obtained by sampling a single temperature sensor located in the return air plenum of an apartment at preselected sample intervals of time. A single on/off calling device in the apartment is also sampled at the preselected sample intervals of time. Sampling of the temperature sensors and on/off calling devices for all of the apartments is controlled by a single microprocessor unit which is conveniently located at a remote working area. No data processing circuitry is located in any of the apartments. The collected data is stored on a day-by-day basis in a conventional tape cassette.

Degree day data loggers are known in the art. For example, see U.S. Pat. No. 3,911,746. The data logger described therein consists of a bridge circuit provided with a temperature sensing element in one arm, a comparator, and an elapsed time meter. Any change in temperature indicated by the bridge output is compared to a reference temperature by the comparator, and the comparator output is accumulated to provide an indication of degree days with respect to the reference temperature. Apparently, the data logger can accumulate degree days for only a single temperature sensing element.

The allocation of fuel costs among plural apartments in an apartment house is also known. For example, see U.S. Pat. No. 4,002,890. Corresponding to each apartment, there are several temperature sensors which are used to compute a weighted mean temperature for the apartment. Apparently, each apartment requires its own analog computer circuit to effect the allocation of fuel costs based on the weighted temperatures.

The computation of internal degree days with respect to an external temperature norm is also known. See U.S. Pat. No. 2,652,724.

An advantage of the present invention is that data indicating the performance of a heating system for an apartment house is automatically collected for evaluation on a day-by-day basis.

Another advantage of the invention is that it can be easily and rapidly installed in an apartment house without the addition of elaborate or expensive hardware components.

A further advantage of the invention is that all of the data processing elements may be located in a remote working area.

Other advantages appear hereinafter.

BRIEF SUMMARY OF THE INVENTION

A microprocessor controlled sensor system for an apartment house having plural apartments and a furnace for heating the apartments. Plural temperature sensors sense the temperatures of the apartments and generate a set of apartment temperature signals. Each temperature sensor is located in one of the apartments. Plural on/off state calling devices operate the furnace and generate a set of digital signals which indicate whether the furnace is being operated. Each of the calling devices is located in one of the apartments and is associated with the temperature sensor located in the same apartment. Temperature sensor processing means convert the apartment temperature signals into a sequence of digital words. Each word represents the temperature of an apartment. Calling device processing means convert the calling device digital signals into a sequence of digital words. Each word represents the state of a calling device. A programmed microprocessor causes the temperature sensor processing means and the calling device processing means to perform the conversion operations at preselected intervals of time. The apartment temperature words are accumulated for each apartment. A count of the number of times that the furnace is operated is also accumulated for each apartment.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figures 1, 2B:
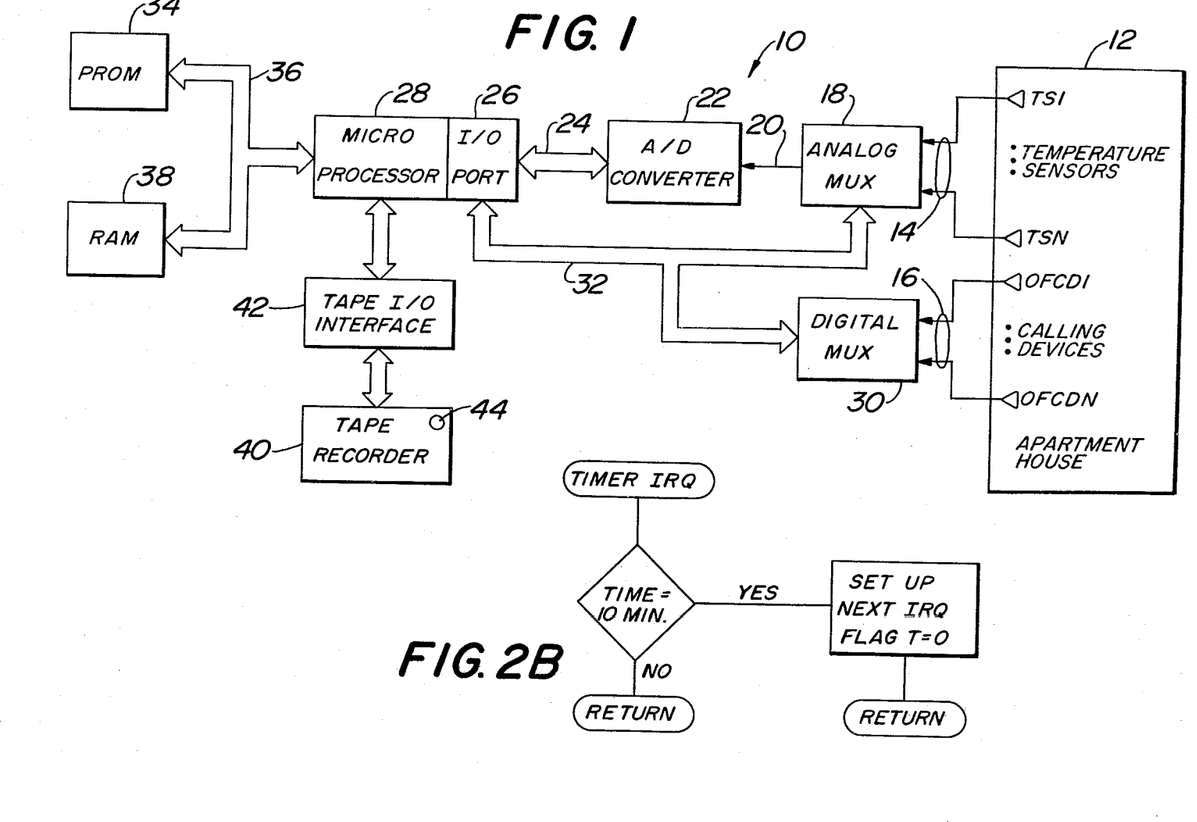
FIG. 1 is a block diagram of the microprocessor controlled energy system of the present invention.
FIGS. 2A–2D comprise a flow chart diagram of the operation of the invention.

Referring to the drawings in detail, wherein like numerals indicate like elements, there is shown in FIG. 1 a microprocessor controlled sensor system 10 according to the present invention. A bank of temperature sensors TS1–TSN are located within the apartments of an apartment house 12. Each of the temperature sensors TS1–TSN is located in one apartment in the apartment house 12. No apartment has more than one temperature sensor. Preferably, each temperature sensor TS1–TSN is located in the return air plenum (not shown) of an apartment. The temperature sensors continuously sense the temperature in the apartments and generate a set of analog apartment temperature signals 14 each of which represent the temperature in one apartment.

A bank of on/off state calling devices OFCD1–OFCDN are also located in the apartments. Each calling device OFCD1–OFCDN is located in one of the apartments. None of the apartments has more than one calling device. Accordingly, each of the calling devices is associated with one of the temperature sensors TS1–TSN. The calling devices may be conventional thermostatic switches provided in modern apartment houses. The calling devices continuously indicate whether the apartment house furnace is being called or operated by the resident of the apartment to supply energy in the form of heat to the apartment. For example, closure of the thermostatic switch would indicate that the furnace is being called by the apartment. If the thermostatic switch is not closed, it indicates that the furnace is not being called by the apartment.

The calling devices OFCD1–OFCDN generate signals which, at any given instant of time, are in either one of two states: on or off. Accordingly, the devices are compatible with binary logic. Of course, the voltage levels of the signals generated by the calling devices OFCD1–OFCDN may be shifted by conventional circuitry (not shown) to render the signal levels fully compatible with any digital logic voltages desired.

The analog apartment temperature signals 14 are sampled and multiplexed by a conventional analog multiplexer 18 to produce a multiplexed apartment temperature signal 20. The multiplexed apartment temperature signal 20 is converted by an analog to digital converter 22 into a sequence of digital words 24 each of which represent the temperature of an apartment. The sequence of digital words 24 is transmitted by an input/output port 26 to the microprocessor 28. The analog multiplexer 18 produces a multiplexed signal 20 only at preselected sample intervals of time determined by the microprocessor 28. At each such interval of time, the multiplexer 18 is addressed by the microprocessor 28 to obtain the multiplexed signal 20.

A digital multiplexer 30 samples and multiplexes the calling device signals 16 generated by calling devices OFCD1-OFCDN. The multiplexed calling device signals are transmitted via a bus 32 to the input/output port 26 whenever the multiplexer 30 is addressed by the microprocessor. The input/output port 26 transmits the multiplexed calling device signals to the microprocessor 28 at the preselected sample intervals of time determined by the microprocessor for sampling the temperature sensors TS1-TSN. Thus, for any given interval of time during which a temperature sensor TS1-TSN is sampled, a corresponding calling device OFCD1-OFCDN is also sampled. In this manner, during any sample interval of time, the temperature of an apartment as well as the state of the calling device for the apartment is collected under control of the microprocessor 28.

As previously indicated, supervision of the analog multiplexer 18 and digital multiplexer 30 is exercised by the microprocessor 28 to collect the samples of apartment temperature and calling device states by selectively addressing the analog multiplexer 18 and the digital multiplexer 30 via the bus 32. Preferably, the sample intervals of time occur every 10 minutes in accordance with a program stored in a PROM 34 associated with the microprocessor 28. Communication between the microprocessor 28 and the PROM 34 for executing the program is maintained over the microprocessor bus 36. As the microprocessor 28 executes the stored program, the temperature sensors TS1-TSN and the calling devices OFCD1-OFCDN are sampled and the data provided by the temperature sensors TS1-TSN and the calling devices OFCD1-OFCDN is collected and stored in a RAM 38 via the microprocessor bus 36. The data collected in the RAM 38 may be dumped by the microprocessor 28 onto a tape in a tape recorder 40 via a tape input/output interface 42 in response to the depression of a key switch 44 on the tape recorder console.

Preferably, the digital multiplexer 30 is one or more cascaded SN74150 multiplexers. The analog to digital converter may be a Motorola 1407L converter. The input/output port 26 may be a MOS-Technology 6522 peripheral interface, and the microprocessor 28 may be a MOS-Technology 6502 microprocessor. The RAM 38 may be a MOS-Technology 2102 random access memory. The tape input/output interface 42 may be a MOS-Technology 6530 peripheral interface having a software programmable interval timer. The PROM 34 may be a MOS-Technology 2708 programmable read-only memory. The operation of each of these components is well known in the digital electronics art.

In operation, the microprocessor controlled heating system 10 executes the stored program by initializing all program variables, including setting a flag T (FLAG T=1) and resetting the software programmable interval timer in peripheral interface 42. See FIG. 2A.

Figures 2A, 2C, 2D:
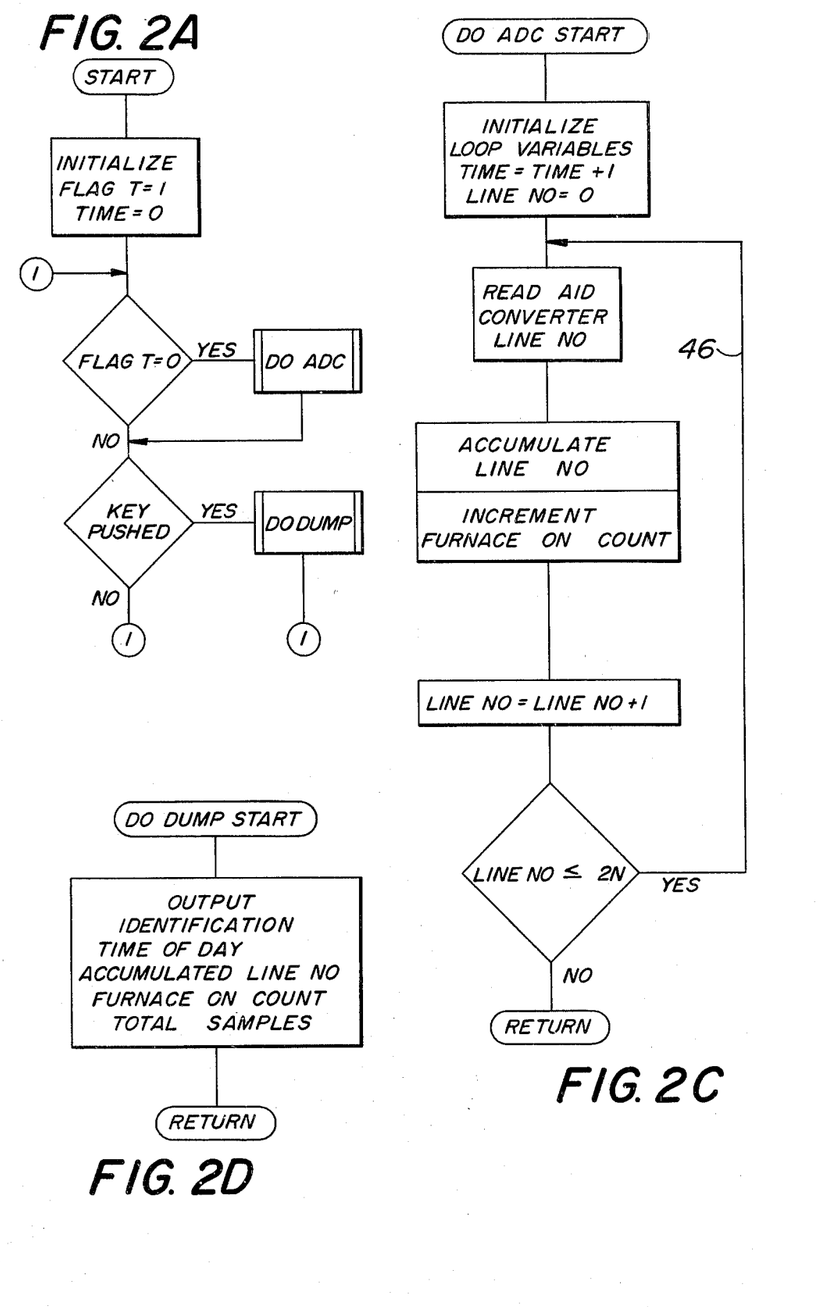

If flag T remains set, the microprocessor 28 checks key switch 44 to determine whether the switch has been depressed. The key switch 44 is depressed to transfer collected data to tape recorder 40 as explained hereinafter. If key switch 44 has not been depressed, the microprocessor returns to point 1 in the program and again tests flag T.

If flag T has been reset (FLAG T=0), the microprocessor 28 fetches the subroutine DOADC. As described hereinafter, flag T is reset temporarily at preselected intervals of time determined by the programmable interval timer in interface 42. The subroutine DOADC is illustrated in FIG. 2C. At the start of the subroutine DOADC, all loop variables are initialized. The software programmable timer is incremented one count (TIME=TIME+1) and the analog multiplexer 18 is addressed to accept the output of the temperature sensor TS1 (LINE NO=0). The analog multiplexer 18 transmits the analog output of temperature sensor TS1 to the analog to digital converter 22, and the microprocessor 28 accepts the digital output of converter 22 via the input/output port 26 (READ A/D CONVERTER LINE NO). The microprocessor 28 transmits the information received from input/output port 26 to a register within the RAM 38 wherein the output of converter 22 due to sensor TS1 is accumulated (ACCUMULATE LINE NO). The RAM 38 is provided with plural registers each of which accumulates the converter 22 output due to one of the sensors TS1-TSN.

The microprocessor 28 also addresses the digital multiplexer 30 to enable the digital multiplexer to transmit the output of calling device OFCD1, the calling device associated with temperature sensor TS1, to the input/output port 26. If the output of calling device OFCD1 indicates that the calling device is operating the furnace, the microprocessor 28 increments a Furnace On Counter corresponding to device OFCD1 in RAM 38 one count (INCREMENT FURNACE ON COUNT). The RAM 38 is provided with plural Furnace On Counters each of which counts the number of times that one of the calling devices OFCD1-OFCDN indicates that the furnace is being operated.

In addition, whenever subroutine DOADC is entered, a counter in RAM 38 is incremented one count (TIME=TIME+1). The counter therefore tracks the number of times that the sensors TS1-TSN and calling devices OFCD1-OFCDN are sampled.

Thereafter, the microprocessor 28 causes the analog multiplexer 18 to accept the output of the next temperature sensor TS2 while causing the digital multiplexer to accept the output of the next calling device OFCD2 which is associated with the temperature sensor TS2 (LINE NO=LINE NO+1).

If less than all the temperature sensors TS1-TS2 and the calling devices OFCD1-OFCDN have been sampled, the microprocessor returns through the loop 46 until all the temperature sensors and calling devices have been sampled (LINE NO$\leq$2N). When all temperature sensors and calling devices have been sampled, the microprocessor returns to the main program in FIG. 2A.

At this point, the microprocessor checks the key switch 44. If the key switch has not been depressed, the microprocessor returns to point 1 in the program and repeats the foregoing operations.

The software programmable interval timer continuously counts the time elapsed since the interval of time that subroutine DOADC was entered, i.e., since the last time that flag T was temporarily reset. See FIG. 2B. If the programmable interval timer has not timed out, flag T remains set and no samples are collected from the temperature sensors and calling devices. The microprocessor merely checks the key switch 44 to determine whether the switch has been depressed. If the switch has not been depressed, the microprocessor returns to point 1 in the main program. See FIG. 2A. The microprocessor fetches the DOADC subroutine only when the timer times out and temporarily resets flag T (FLAG T=0).

In the preferred embodiment described herein, the interval timer times out every 10 minutes. When 10 minutes have passed, the timer temporarily resets the flag T. Accordingly, the microprocessor 28 enters subroutine DOADC only at preselected intervals of time determined by the interval timer, viz., every 10 minutes.

If, at any time, it is desired to dump the data collected in RAM 38 into the tape 40, the operator merely depresses the key switch 44. Accordingly, the microprocessor enters the subroutine DODUMP. See FIG. 2A.

The subroutine DUDUMP is illustrated in FIG. 2D. The microprocessor 28 retrieves the accumulated temperature sensor readings and the furnace on count for each apartment from the RAM 38. This information is transmitted by the microprocessor 28 via the tape input/output interface 42 to the tape recorder 40 for external tape storage. In addition, the microprocessor transmits information as to the identification of the microprocessor and apartment house and the time of day that the information is being transmitted to the tape.

The tape recorder 40 may be any suitable conventional recorder for information storage such as the Phillips cassette recorder. The tape input/output interface 42 is a MOS-Technology 6530 interface as previously indicated. This interface is provided with its own ROM and is programmed to cooperate with microprocessor 28 in executing the DODUMP subroutine. The DODUMP subroutine itself is well known and is commercially available for use with the interface 42.

The instruction for the main program indicated in FIG. 2A, the subroutine DOADC indicated in FIG. 2C, and the interval timer program indicated in FIG. 2C are annexed hereto.

The present invention may be embodied in other specific forms without departing from the spirit or essential attributes thereof and, accordingly, reference should be made to the appended claims, rather than to the foregoing specification as indicating the scope of the invention.

13:09 19-Jul-77    Page 1

```
; SET VALUES AND ADDRESS CONSTANTS
;
STATION  =    $01              ;STATION ID
SBD      =    $1742
PBDD     =    $1743            ;DATA AND DIRECTION REGISTERS (KIMS)
CLKRDI   =    $1744            ;CLOCK USED BY MAG TAPE SYSTEM
CLK1T    =    $1747
KIM      =    $1C00            ;MAIN ENTRY POINT TO KIM
SCAND    =    $1F19            ;PUT SOMETHING ONTO DISPLAY
CHKT     =    $194C            ;CALCULATE CHECK BITS
;
CHKL     =    $17E7            ;TAPE CHECKSUM
CHKH     =    $17E8            ;TAPE CHECKSUM HIGH
;
T1024S   =    2289             ;NUMBER OF TIMES TO COUNT TO 1024T*$FF
ASIZE    =    3
FSIZE    =    2
LINES    =    32
BASET    =    $40
WAITT    =    $04              ;WAIT TIME FOR DAC AND COMPARATOR
;
DACM     =    $1702            ;DIGITAL TO ANALOG CONVERTER MUX
DAC      =    $1700            ;DIGITAL TO ANALOG CONVERTER
COMPAR   =    $1702            ;I/O PORT ON WHICH THE COMPARATOR INPUTS
TIMER    =    $170F            ;1024T, INTERUPT WHEN ZERO
;
; I/O PORT INFO
;
; USER PORT A IS DAC - ALL OUTPUT
;
; USER PORT B IS SPLIT - PART INPUT, PART OUTPUT, AS FOLLOWS
;
;        PB7    IRQ - USED BY THE TIMER - CANNOT BE USED AS I/O
;        PB6    CHIP SELECT - CANNOT BE USED AT ALL
;        PB5    COMPARATOR INPUT
;        PB4 - 0 MUX CONTROL - UP TO 32 SPOTS.
```

```
        . = 0
DMPST
STATID  .BLOCK  1                       ;STATION ID
DMPSIZ  .BLOCK  1                       ;NUMBER OF BYTES DUMPED - HEADER
TIME    .BLOCK  2
ASTART  .BLOCK  LINES*ASIZE
FURNAC  .BLOCK  LINES*FSIZE             ;COUNT OF HOW MANY TIMES FURNACE IS ON
AEND
DMPEND
TIMES   .BLOCK  2
FLAGT   .BLOCK  1
TIC     .BLOCK  1
COUNT   .BLOCK  1
TRIB    .BLOCK  1
INCR    .BLOCK  1
LINENO  .BLOCK  1
POINT
POINTL  .BLOCK  1
POINTH  .BLOCK  1
PNT2
PNT2L   .BLOCK  1
PNT2H   .BLOCK  1
GANG    .BLOCK  1
SAVY    .BLOCK  1
        . = $200                        ;TOP HALF OF FIRST K (PAGES 3 AND 4)
POWER   CLD
        CLI                             ;MAKE SURE TIMER CAN INTERRUPT
        LDA     #$FF
        STA     TIMER                   ;START TIMER
        STA     FLAGT                   ;SET FLAG
        LDA     #T1024S                 ;NUMBER OF TIMES TO INTERUPT BEFORE TIME OUT
        STA     TIMES
        LDA     #T1024S/$100
        STA     TIMES+1

JSR     ZERO
        STA     TIME+1
        LDA     #1
        STA     TIME                    ;START AT TIME 1
;
        LDA     #$FF
        STA     DAC+1                   ;DAC IS ALL OUTPUT
        LDA     #$1F
        STA     DACM+1                  ;DACM (COMPAR) IS PART OUT & PART IN
        LDA     #STATION
        STA     STATID                  ;STATION ID
;
        LDA     #AEND-ASTART            ;NUMBER OF BYTES DUMPED - HEADER
        STA     DMPSIZ
;               MAIN LOOP - SHOWS WHEN TO CHECK WHAT
;
MLOOP   BIT     FLAGT                   ;TEST FLAG
        BMI     NOCHECK                 ;NOT SET
        JSR     DOADC                   ;SET, SO GO INPUT
NOCHECK JSR     SCAND                   ;ALWAYS OUTPUT SOMETHING TO DISPLAY
        BEQ     MLOOP                   ;NO KEY HAS BEEN PUSHED
        JSR     DODUMP                  ;OOPS - KEY PUSHED, DUMP
        JMP     MLOOP
;
;               DUMPING ROUTINE
;
DODUMP  LDA     #00
        STA     CHKL
        STA     CHKH
        LDA     #$27                    ;I DONT KNOW, I JUST STOLE IT
        STA     SBD
        LDA     #$BF
        STA     PBDD
;
        LDX     #100                    ;OUTPUT 100 SYNS
        LDA     #$16
        JSR     HIC
;
        LDA     #'*                     ;START OF DATA CHAR
        JSR     OUTCHT
        LDA     STATID                  ;ID
        JSR     OUTBYT
        LDA     #DMPST                  ;START ADDRESS
        JSR     OUTBTC                  ;I DONT KNOW WHY NOT OUTBYT
```

```
            LDA      #DMPST/$100
            JSR      OUTBTC
;
            LDX      #0
DMPLP       LDA      DMPST,X                 ;GET DATA
            JSR      OUTBTC
            INX
            CPX      #DMPEND-DMPST
            BMI      DMPLP
;
            LDA      #'/                     ;END OF DATA CHAR
            JSR      OUTCHT
            LDA      CHKL
            JSR      OUTBYT                  ;CHECKSUM
            LDA      CHKH
            JSR      OUTBYT
            LDA      #$04                    ;EOT
            LDX      #2
            JSR      HIC
;
;           NOW CLEAR EVERY THING IN ACCUMS
;(BY DROPPING THROUGH TO ZERO)
;           ZERO ACCUMS
;
ZERO        LDX      #AEND-ASTART
            LDA      #0
ZEROLP      STA      ASTART,X
            DEX
            BPL      ZEROLP
            RTS                              ;GEE, THAT WAS SIMPLE
HIC         STX      TIC
HIC1        PHA                              ;MULTIPLE OUTCHT'S
            JSR      OUTCHT
            PLA
            DEC      TIC
            BNE      HIC1
            RTS
;
OUTBTC      JSR      CHKT                    ;OUTPUT BYTE W/ CHECKSUM CALCULATIONS
OUTBYT      PHA                              ;OUTPUT BYTE WITH OR WITHOUT CHECKSUM
            LSR      A                       ;HIGH ORDER FIRST
            LSR      A
            LSR      A
            LSR      A
            JSR      HEXOUT
            PLA
            JSR      HEXOUT                  ;NOW LOW ORDER
            RTS
;
HEXOUT      AND      #$0F                    ;OUTPUT ONE HEX DIGIT
            CMP      #$0A
            CLC
            BMI      HEX1
            ADC      #$07                    ;A--F ADD SOME EXTRA TO MAKE ALPHABETIC
HEX1        ADC      #$30
OUTCHT      LDY      #$08
            STY      COUNT
TRY         LDY      #$02
            STY      TRIB
ZON         LDX      NPUL,Y
            PHA
ZON1        BIT      CLKRDI
            BPL      ZON1
            LDA      TIMG,Y
            STA      CLK1T
            LDA      GANG
            EOR      #$80
            STA      SBD
            STA      GANG
            DEX
            BNE      ZON1
            PLA
            DEC      TRIB
            BEQ      SETZ
            BMI      ROUT
            LSR      A
            BCC      ZON
```

```
SETZ    LDY     #0
        BEQ     ZON
ROUT    DEC     COUNT
        BNE     TRY
        RTS
;
NPUL    .BYTE   $02
TIMG    .BYTE   $C3,$03,$7E
; INPUT ROUTINES
;
DOADC   LDX     #0                              ;START WITH LINE ZERO
        LDA     #ASTART/$100
        STA     POINTH
        LDA     #ASTART
        STA     POINTL
        LDA     #FURNAC/$100                    ;GET HIGH ORDER ADDR
        STA     PNT2H
        LDA     #FURNAC                         ;LOW ORDER
        STA     PNT2L
;
INLP    STX     LINENO
        JSR     GETADC
        SEC
        SBC     #BASET
        CLC
        LDY     #ASIZE
        LDX     #0
        ADC     (POINT,X)
        JMP     ADDLPX
ADDLP   LDA     (POINT,X)
        ADC     #0
ADDLPX  STA     (POINT,X)
        INC     POINTL
        BNE     NOINC
        INC     POINTH
NOINC   DEY
        BNE     ADDLP
;
;HERE WE NEED TO CHECK THE FURNACE  C=1 IF ON, C=0 IF OFF
        LDY     #FSIZE                          ;HOW MANY BYTE/REGISTER
FURNLP  LDA     (PNT2,X)                        ;ACTUALLY (PNT2) AS X=0
        ADC     #0                              ;ADD 0 PLUS CARRY
        STA     (PNT2,X)
        INC     PNT2L                           ;INC ADDR
        BNE     NOINC2                          ;DONT INC HIGH ADDR
        INC     PNT2H
NOINC2  DEY                                     ;ONE MORE BYTE TAKEN CARE OF
        BNE     FURNLP                          ;BUT MORE TO COME
;
;
        LDX     LINENO
        INX
        CPX     #LINES
        BMI     INLP
        INC     TIME
        BNE     RET
        INC     TIME+1
RET     LDA     #$FF
        STA     FLAGT                           ;RESET FLAG - HAVE READ IN
        RTS
; GET A PARTICULAR ADC VALUE -- USING 1 DAC AND 1 COMPARATOR. (BINARY SEARCH)
;
GETADC  STX     DACM                            ;OUTPUT INDEX (TO MUX)
        LDA     #$80                            ;START AT MIDPOINT, WORK OUT
        STA     INCR
        LSR     INCR                            ;SHIFT RIGHT TO MAKE INCREMENT
GTLOOP  STA     DAC                             ;OUTPUT TO DAC
        JSR     DELAY
        PHA
        LDA     #$20                            ;GET READY TO TEST COMPARATOR
        BIT     COMPAR
        BNE     TRYHI
        SEC
        PLA
        SBC     INCR
        JMP     NEXT
```

```
TRYHI   CLC
        PLA
        ADC     INCR
NEXT    LSR     INCR
        BNE     GTLOOP
        RTS
;
DELAY   STY     SAVY            ;DELAY ROUTINE
        LDY     #WAITT
DELP    DEY
        BNE     DELP
        LDY     SAVY
        RTS

TIMINT  PHA                     ;SAVE ACC
        LDA     #$FF
        STA     TIMER
        DEC     TIMES
        BEQ     TIME1
        PLA
        RTI                     ;RETURN IF HAVEN'T CLEARED TIMES
TIME1   DEC     TIMES+1
        BEQ     TMOUT           ;TRU TIME OUT
        PLA
        RTI                     ;TIMES WAS CLEARED, BUT NOT TMOUT
;
TMOUT   LDA     #T1024S         ;TIMES TO GO
        STA     TIMES
        LDA     #T1024S/$100
        STA     TIMES+1
        LDA     #0
        STA     FLAGT           ;SET FLAG BECAUSE INPUT NEEDS TO BE DONE
        PLA
        RTI
; LOAD VECTORS AND OTHER THINGS
;
        . = $00EF               ;KIM STORAGE
;
PC      .WORD   POWER
P       .BYTE   0
SP      .BYTE   $FF
A       .BYTE   0
Y       .BYTE   0
X       .BYTE   0
;
; INTERRUPT VECTORS
;
        . = $17FA
NMI     .WORD   KIM             ;ENTRY TO KIM
RST     .WORD   0               ;DUMMY, NEVER USED
IRQ     .WORD   TIMINT          ;TIME COUNTER ROUTINE
;
        .END
```

| | | | | | | | |
|---|---|---|---|---|---|---|---|
| COMPAR | 1702 | DAC | 1700 | DACM | 1702 | WAITT | 0004 |
| LINES | 0020 | FSIZE | 0002 | ASIZE | 0003 | T1024S | 08F1 |
| CHKL | 17E7 | CHKT | 194C | SCAND | 1F19 | KIM | 1C00 |
| CLKRDI | 1744 | PBDD | 1743 | SBD | 1742 | STATIO | 0001 |
| RST | 17FC | NMI | 17FA | X | 00F5 | Y | 00F4 |
| SP | 00F2 | P | 00F1 | PC | 00EF | TMOUT | 0393 |
| TIMINT | 0381 | DELP | 037B | NEXT | 0372 | TRYHI | 036E |
| GTLOOP | 0359 | RET | 034B | NOINC2 | 033B | FURNLP | 032F |
| ADDLP | 031E | ADDLPX | 0322 | GETADC | 0350 | INLP | 030C |
| SETZ | 02ED | TIMG | 02F7 | ZON1 | 02CC | NPUL | 02F6 |
| TRY | 02C4 | HEX1 | 02BE | HEXOUT | 02B5 | HIC1 | 029B |
| DMPLP | 026D | OUTBTC | 02A5 | OUTBYT | 02A8 | OUTCHT | 02C0 |
| DODUMP | 023E | DOADC | 02FA | NOCHEC | 0233 | MLOOP | 022C |
| POWER | 0200 | SAVY | 00B1 | GANG | 00B0 | PNT2H | 00AF |
| PNT2 | 00AE | POINTH | 00AD | POINTL | 00AC | POINT | 00AC |
| INCR | 00AA | TRIB | 00A9 | COUNT | 00A8 | TIC | 00A7 |
| TIMES | 00A4 | DMPEND | 00A4 | AEND | 00A4 | FURNAC | 0064 |
| TIME | 0002 | DMPSIZ | 0001 | STATID | 0000 | DMPST | 0000 |
| AK | 1EFE | GETKEY | 1F6A | GETCH | 1E5A | PRTBYT | 1E3B |
| OUTCH | 1EA0 | OUTSP | 1E9E | CRLF | 1E2F | GETBYT | 1F9D |

| | | | | | | |
|---|---|---|---|---|---|---|
| A | 307‡ | | | | | |
| ADDLP | 220‡ | 227 | | | | |
| ADDLPX | 219 | 222‡ | | | | |
| AEND | 44‡ | 83 | 138 | | | |
| ASIZE | 16‡ | 42 | 216 | | | |
| ASTART | 42‡ | 83 | 138 | 140 | 202 | 204 |
| BASET | 19‡ | 214 | | | | |
| CHKH | 13‡ | 98 | 128 | | | |
| CHKL | 12‡ | 97 | 126 | | | |
| CHKT | 10‡ | 152 | | | | |
| CLK1T | 7‡ | 178 | | | | |
| CLKRDI | 6‡ | 175 | | | | |
| COMPAR | 24‡ | 261 | | | | |
| COUNT | 49‡ | 170 | 193 | | | |
| DAC | 23‡ | 77 | 257 | | | |
| DACM | 22‡ | 79 | 253 | | | |
| DELAY | 258 | 274‡ | | | | |
| DELP | 276‡ | 277 | | | | |
| DMPEND | 45‡ | 121 | | | | |
| DMPLP | 118‡ | 122 | | | | |
| DMPSIZ | 40‡ | 84 | | | | |
| DMPST | 38‡ | 112 | 114 | 118 | 121 | |
| DOADC | 89 | 201‡ | | | | |
| DODUMP | 92 | 96‡ | | | | |
| FLAGT | 47‡ | 66 | 87 | 249 | 297 | |
| FSIZE | 17‡ | 43 | 230 | | | |
| FURNAC | 43‡ | 206 | 208 | | | |
| FURNLP | 231‡ | 238 | | | | |
| GANG | 59‡ | 179 | 182 | | | |
| GETADC | 212 | 253‡ | | | | |
| GTLOOP | 257‡ | 271 | | | | |
| HEX1 | 166 | 168‡ | | | | |
| HEXOUT | 158 | 160 | 163‡ | | | |
| HIC | 106 | 132 | 144‡ | | | |
| HIC1 | 145‡ | 149 | | | | |
| INCR | 51‡ | 255 | 256 | 265 | 269 | 270 |
| INLP | 211‡ | 244 | | | | |
| IRQ | 316‡ | | | | | |
| KIM | 8‡ | 314 | | | | |
| LINENO | 52‡ | 211 | 241 | | | |
| LINES | 18‡ | 42 | 43 | 243 | | |
| MLOOP | 87‡ | 91 | 93 | | | |
| NEXT | 266 | 270‡ | | | | |
| NMI | 314‡ | | | | | |
| NOCHEC | 88 | 90‡ | | | | |
| NOINC | 224 | 226‡ | | | | |
| NOINC2 | 235 | 237‡ | | | | |
| NPUL | 173 | 197‡ | | | | |
| OUTBTC | 113 | 115 | 119 | 152‡ | | |
| OUTBYT | 111 | 127 | 129 | 153‡ | | |
| OUTCHT | 109 | 125 | 146 | 169‡ | | |
| P | 305‡ | | | | | |
| PBDD | 5‡ | 102 | | | | |
| PC | 304‡ | | | | | |
| PNT2 | 56‡ | 231 | 233 | | | |
| PNT2H | 58‡ | 207 | 236 | | | |
| PNT2L | 57‡ | 209 | 234 | | | |
| POINT | 53‡ | 218 | 220 | 222 | | |
| POINTH | 55‡ | 203 | 225 | | | |
| POINTL | 54‡ | 205 | 223 | | | |
| POWER | 62‡ | 304 | | | | |
| RET | 246 | 248‡ | | | | |
| ROUT | 188 | 193‡ | | | | |
| RST | 315‡ | | | | | |
| SAVY | 60‡ | 274 | 278 | | | |
| SBD | 4‡ | 100 | 181 | | | |
| SCAND | 9‡ | 90 | | | | |
| SETZ | 187 | 191‡ | | | | |
| SP | 306‡ | | | | | |
| STATID | 39‡ | 81 | 110 | | | |
| STATIO | 3‡ | 80 | | | | |
| T1024S | 15‡ | 67 | 69 | 292 | 294 | |
| TIC | 48‡ | 144 | 148 | | | |
| TIME | 41‡ | 72 | 74 | 245 | 247 | |
| TIME1 | 284 | 287‡ | | | | |
| TIMER | 25‡ | 65 | 282 | | | |
| TIMES | 46‡ | 68 | 70 | 283 | 287 | 293 | 295 |
| TIMG | 177 | 198‡ | | | | |

| | | | |
|---|---|---|---|
| TIMINT | 280# | 316 | |
| TMOUT | 288 | 292# | |
| TRIB | 50# | 172 | 186 |
| TRY | 171# | 194 | |
| TRYHI | 262 | 267# | |
| WAITT | 20# | 275 | |
| X | 309# | | |
| Y | 308# | | |
| ZERO | 71 | 138# | |
| ZEROLP | 140# | 142 | |
| ZON | 173# | 190 | 192 |
| ZON1 | 175# | 176 | 184 |

I claim:

1. A microprocessor controlled sensor system for an apartment house having plural apartments and a furnace for heating said apartments, comprising:

plural temperature sensors for sensing the temperatures of said apartments and for generating a set of apartment temperature signals, each temperature sensor being located in one of said apartments, plural on/off state calling devices for operating said furnace and for generating a set of digital signals representative of whether said furnace is being operated, each of said on/off state calling devices being located in one of said apartments and being associated with the temperature sensor located in that apartment, temperature sensor processing means for converting said set of apartment temperature signals into a sequence of digital words, each word representing the temperature of one of said apartments, calling device processing means for converting said set of digital signals representative of whether said furnace is being operated into a sequence of digital words, each word representing the state of one of said calling devices, a programmed microprocessor for causing said temperature sensor processing means to convert said set of apartment temperature signals into said sequence of digital words representing the temperature of said apartments at preselected sample intervals of time and for causing said calling device processing means to convert said digital signals representative of whether said furnace is being operated into said sequence of digital words representing the states of said calling devices at said preselected sample intervals of time, and memory means responsive to said microprocessor for accumulating for each apartment said digital words representative of apartment temperatures and for counting for each apartment the number of times that said digital signals representative of whether said furnace is being operated indicate that said furnace is being operated.

2. The microprocessor controlled sensor system according to claim 1 including a tape recorder, and a tape input/output interface connecting said tape recorder to said microprocessor for transmitting to said tape recorder said accumulated digital words representative of apartment temperatures and said count representative of the number of times that said furnace is being operated.

3. A microprocessor controlled sensor system for an apartment house having plural apartments and a furnace for heating said apartments, comprising:

plural temperature sensors for sensing the temperatures of said apartments and for generating a set of apartment temperature signals, each temperature sensor being located in one of said apartments, plural on/off state calling devices for operating said furnace and for generating a set of digital signals representative of whether said furnace is being operated, each of said on/off state calling devices being located in one of said apartments and being associated with the temperature sensor located in that apartment, an analog multiplexer for sampling and multiplexing said set of apartment temperature signals, an analog to digital converter for converting said multiplexed apartment temperature signals into a sequence of digital words, each word representing the temperature of one of said apartments, a digital multiplexer for sampling and multiplexing said set of digital signals generated by said calling devices, a programmed microprocessor for causing said analog multiplexer to sample and multiplex said set of apartment temperature signals at preselected sample intervals of time and for causing said digital multiplexer to sample and multiplex said set of digital signals generated by said calling devices at said preselected sample intervals of time, a random access memory responsive to said microprocessor for accumulating for each apartment said digital words representative of apartment temperatures and for counting for each apartment the number of times that said digital signals representative of whether said furnace is being operated indicate that said furnace is being operated.

4. The microprocessor controlled sensor system according to claim 3 including a tape recorder, and a tape input/output interface connecting said tape recorder to said microprocessor for transmitting said accumulated digital words representative of apartment temperatures and said counts of the number of times that said furnace is being operated to said tape recorder.

5. A method of collecting energy information for an apartment house having plural apartments, a furnace for heating said apartments and plural calling devices located in said apartments for operating said furnace, comprising:

sensing the temperatures of said apartments and generating a set of apartment temperature signals representative thereof, sensing the states of said plural calling devices to determine whether said furnace is being operated by said calling devices, repeating said temperature sensing and state sensing steps at preselected intervals of time, accumulating for each apartment said apartment temperature signals, and counting for each apartment the number of times that a calling devices located at that apartment operates said furnace.

* * * * *